(12) United States Patent
Monereau

(10) Patent No.: US 6,379,430 B1
(45) Date of Patent: Apr. 30, 2002

(54) USE OF AN ACTIVATED ALUMINA FOR REMOVING THE $CO_2$ FROM A GAS

(75) Inventor: Christian Monereau, Paris (FR)

(73) Assignee: L'Air Liquide, Societe Anonyme a Directoire et Conseil de Surveillance pour l'Etude et l'exploitation des procedes Georges Claude, Paris (FR)

( * ) Notice: Subject to any disclaimer, the term of this patent is extended or adjusted under 35 U.S.C. 154(b) by 0 days.

(21) Appl. No.: 09/629,700

(22) Filed: Jul. 31, 2000

(30) Foreign Application Priority Data

Sep. 13, 1999 (FR) .............................. 99 11425

(51) Int. Cl.⁷ .......................................... B01D 53/047
(52) U.S. Cl. .............................. 95/96; 95/103; 95/115; 95/117; 95/119; 95/129; 95/142; 95/143; 95/900
(58) Field of Search .............................. 95/99, 114, 115, 95/117–120, 123–125, 129, 139, 142, 143, 900, 96–98, 100–106

(56) References Cited

U.S. PATENT DOCUMENTS

| 4,493,715 | A | * | 1/1985 | Hogan et al. | ................. | 95/139 |
| 4,798,711 | A | * | 1/1989 | Neal et al. | ................. | 95/129 X |
| 5,232,474 | A | | 8/1993 | Jain | ........................ | 55/26 |
| 5,582,029 | A | | 12/1996 | Occhialini et al. | ............. | 62/636 |
| 5,846,295 | A | * | 12/1998 | Kalbassi et al. | ............... | 95/105 |
| 5,914,455 | A | * | 6/1999 | Jain et al. | ................. | 95/139 X |
| 5,917,136 | A | * | 6/1999 | Gaffney et al. | ........... | 95/900 X |
| 6,238,460 | B1 | * | 5/2001 | Deng et al. | ................. | 95/139 X |

FOREIGN PATENT DOCUMENTS

| EP | 0 111 911 | 6/1984 |
| EP | 0 862 937 | 9/1998 |
| EP | 0 904 824 | 3/1999 |

* cited by examiner

*Primary Examiner*—Robert H. Spitzer
(74) *Attorney, Agent, or Firm*—Young & Thompson

(57) ABSTRACT

A process, especially a PSA or TSA process, for purifying a gas containing at least carbon dioxide ($CO_2$) as impurity, in which the carbon dioxide is adsorbed on an adsorbent comprising particles of activated alumina. According to this process, the activated alumina has a specific surface area of between 200 $m^2/g$ and 299 $m^2/g$ and contains at least 80% aluminum oxide ($Al_2O_3$), silicon oxide ($SiO_2$), iron oxide ($Fe_2O_3$) and from 0.001% to 7.25% of at least one oxide of at least one alkali or alkaline-earth metal, such as sodium and potassium oxides. According to the invention, the gas stream to be purified is air or a synthesis gas.

19 Claims, 1 Drawing Sheet

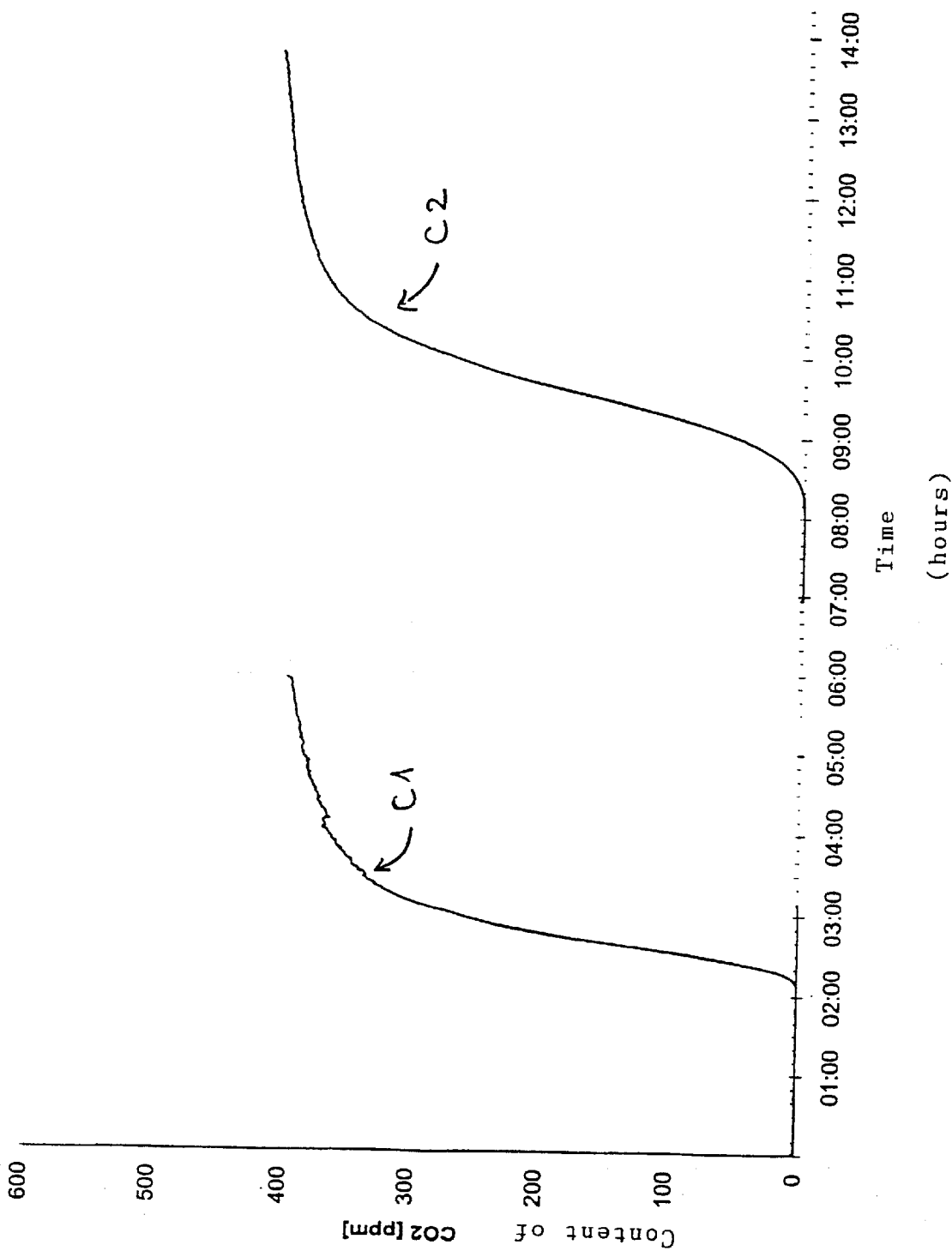

USE OF AN ACTIVATED ALUMINA FOR REMOVING THE CO₂ FROM A GAS

FIELD OF THE INVENTION

The present invention relates to the use of an activated alumina having a specific surface area of less than 299 m$^2$/g, as adsorbent intended for removing the $CO_2$ and/or $H_2O$ present in a gas stream, particularly a stream of air or of a synthesis gas, the adsorbent being employed in an adsorption process of the PSA, TSA or similar type.

BACKGROUND OF THE INVENTION

Before being able to be used for industrial purposes, many gases have to be pretreated, in particular purified, in order to remove therefrom all or some of the impurities that may be present, in varying amounts, in them.

In this regard, mention may especially be made of the atmospheric air and synthesis gases. For example, it is known that the atmospheric air contains impurities of the carbon dioxide ($CO_2$) and/or water vapour ($H_2O$) type which have to be removed before any cryogenic separation of the air, that is to say prior to the air being introduced into the heat exchangers of the cold box of an air separation unit.

This is because, in the absence of such an air pretreatment, condensation and solidification of these impurities in the form of ice may occur when cooling the air to a cryogenic temperature, which may result in problems of the cryogenic separation unit or equipment, especially the heat exchangers, distillation columns, etc., becoming blocked and, consequently, damaging this unit or equipment.

By way of indication, the $CO_2$ content of the atmospheric air is usually between 200 vpm and 600 vpm, typically about 350 to 450 vpm.

To avoid these problems, it is common practice to pretreat the air that has to be cryogenically separated prior to this cryogenic separation. This pretreatment of the air is generally called "front" purification since it is carried out upstream of the cryogenic separation unit.

This pretreatment of the air is carried out by the TSA (Temperature Swing Adsorption) process or by the PSA (Pressure Swing Adsorption) process, depending on the case.

Conventionally, a TSA process cycle comprises the following steps:

a) purification of the air by adsorption of the impurities at a superatmospheric pressure, e.g. greater than 1 bar;
b) depressurization of the adsorber down to atmospheric pressure or below atmospheric pressure, e.g. at about or less than 1 bar;
c) complete regeneration of the adsorbent at approximately atmospheric pressure using a hot gas, especially by the residual gases or waste gases, typically impure nitrogen coming from an air separation unit and warmed by means of one or more heat exchangers;
d) cooling of the adsorbent, especially by continuing to introduce the waste gas coming from the air separation unit, but not warmed, into the adsorbent;
e) repressurization of the adsorber with purified air coming, for example, from another adsorber which is in production phase.

Similarly, as regards a PSA process cycle, this comprises substantially the same steps a), b) and e), but is distinguished from a TSA process by the waste gas or gases not being warmed during the regeneration step (step c)), and therefore by the absence of step d), and, in general, by a shorter cycle time than in the TSA process.

Preferably, the air pretreatment devices comprise at least two adsorbers, operating in parallel, that is to say operating alternately, one of the adsorbers being in production phase while the other is in regeneration phase.

Such TSA or PSA air purification processes are described, for instance, in documents U.S. Pat. No. 3,738,084, U.S. Pat. No. 5,531,808, U.S. Pat. No. 5,587,003 and U.S. Pat. No. 4,233,038.

Furthermore, it is known that, when adsorbent particles are used for prepurifying the air before separating it by cryogenic distillation, it is common practice to adjust (by water cooling) the temperature of the compressed air from a temperature normally of at least 80° C., or even higher, down to the ambient temperature and then to precool the air before it is introduced into the adsorber or adsorbers; this is usually carried out by a refrigeration unit taking the air from the ambient temperature down to a temperature below the ambient temperature. This is, moreover, clearly explained by the document *Industrial Gases & Cryogenics Today, IOMA Broadcaster, Air Purification for cryogenic air separation units*, Jan.–Feb. 1984, p. 15 et seq. or by document EP-A-438,282.

This is because it is recommended to precool the air before subjecting it to an adsorption separation step since, as is known by those skilled in the art, the lower the adsorption temperature the more effective the adsorption of the impurities. In other words, the effectiveness of the air prepurification is markedly favoured in the case of low temperatures, that is to say temperatures close to 5° C.

Next, after it has passed through the purification zone, that is to say through the adsorber or adsorbers, the air stripped of all or some of its harmful impurities, particularly the $CO_2$ and $H_2O$ impurities, is conventionally cooled to a cryogenic temperature, i.e. generally to a temperature of less than approximately −120° C., before being taken to the cryogenic distillation unit and introduced into one or more distillation columns for the purpose of being separated therein, for recovering nitrogen, oxygen and/or argon.

Similarly, the synthesis gases or syngases usually contain impurities that have to be removed prior to any cryogenic separation of the mixture of hydrogen ($H_2$) and carbon monoxide (CO) of which the syngas is composed. For example, the synthesis gases coming from an amine scrubbing unit conventionally contain from 1 to 600 vpm, preferably from 10 to 500 vpm, of $CO_2$-type impurities.

In general, it is normal to use an adsorbent of the zeolite type, for example an X or A zeolite, to remove the $CO_2$ impurities and to employ an adsorbent of the alumina, zeolite or silica-gel type in order to adsorb the water vapour ($H_2O$) contained in a gas to be purified. For example, reference may be made to document EP-A-718,024 which describes a process for removing the $CO_2$ contained in a stream of air at ambient temperature by means of an adsorbent of the X zeolite type having an Si/Al ratio of less than 1.15, preferably about 1. It should be noted that a similar process is disclosed by document EP-A-284,850.

Although certain documents refer to the possibility of using alumina for removing $CO_2$, alumina is recommended more for removing water since it has a good mechanical strength, a high water adsorptivity and a high water affinity, it causes only very little coadsorption of the other gases and, in addition, is easy to regenerate.

On the other hand, alumina is reputed to be a less effective adsorbent for removing $CO_2$ and, in order to overcome this lack of effectiveness, it is common practice to follow the alumina bed with one or more beds of another adsorbent, such as a zeolite, as described, for example, by documents U.S. Pat. No. 5,137,548, U.S. Pat. No. 4,541,851 and U.S. Pat. No. 5,689,974.

In order to try to solve this problem, certain documents suggest the use of modified aluminas, particularly aluminas doped with metal cations, such as sodium and/or potassium cations.

For example, document EP-A-766,991 teaches a PSA (Pressure Swing Adsorption)-type process for adsorbing the $CO_2$ present in a gas, in which process the gas is brought into contact with particles of an impregnated alumina, which alumina is obtained by impregnating it with a basic solution having a pH of greater than 9, and then dried, but without thereafter being calcined. In other words, the particles of activated alumina are formed and then impregnated with a suitable solution and finally dried at a temperature of about 120° C. In this case, the impregnation treatment therefore takes place on already formed particles of activated alumina.

Alternatively, document U.S. Pat. No. 4,433,981 describes a process for removing the $CO_2$ from a gas stream by bringing it into contact, at a temperature ranging up to 300° C., with alumina particles prepared by impregnating a porous alumina with a solution of potassium oxide or sodium oxide, followed by drying and calcining the particles thus obtained.

Moreover, the teaching of document EP-A-862,937 is similar to that of document EP-A-766,991 apart from the fact that the impregnated alumina particles obtained are used in a TSA (Temperature Swing Adsorption) process.

Furthermore, document EP-A-862,936 recommends making a mixture of alumina particles and zeolite particles in order to allow simultaneous removal of the $CO_2$ and water which are contained in a gas, such as air. Preferably, the alumina used is that described by EP-A-766,991 and the zeolite employed is that given by EP-A-718,024.

Moreover, documents EP-A-904,823, EP-A-904,824 and EP-A-904,825 describe the use of activated alumina or of a composite bed of activated alumina and of zeolite in order to remove the $CO_2$ and the water vapour from a stream of gas, such as air. The activated alumina employed is an alumina sold by Laroche under the reference A-201 AA having a specific surface area, also called "area per unit mass", of between 300 and 345 $m^2/g$.

Furthermore, similar activated aluminas having specific surface areas of between, on the one hand, 300 and 380 $m^2/g$ and, on the other hand, 325 and 360 $m^2/g$ are known and sold by Procatalyse and by Alcoa, respectively, under the brand names Activated Alumina 2-5 Grade A and Activated Alumina F-200 respectively.

However, despite the many existing purification processes, none of them may be regarded as being completely satisfactory from the industrial standpoint, since there still remains the problem of how to purify, with even greater effectiveness, a stream of gas, particularly air or synthesis gas contaminated with $CO_2$ and/or water vapour impurities, so as to be able to remove these impurities by adsorption as much as possible and then to recover a stream of almost pure gas, that is to say one from which most of these impurities have been removed.

SUMMARY OF THE INVENTION

The object of the present invention is therefore to improve the known processes, by providing a process for purifying a gas, particularly air or syngas, which makes it possible to achieve higher performance levels than the aforementioned processes, particularly with regard to the removal of $CO_2$ and of the water contained in the gas to be purified, that is to say the object of the present invention is to provide a gas purification process allowing effective removal of at least the $CO_2$, and preferably both the carbon dioxide ($CO_2$) and water vapour, present as impurities in a gas to be purified.

The subject of the present invention is therefore a process for purifying a gas containing at least carbon dioxide ($CO_2$) as impurity, in which at least some of the carbon dioxide ($CO_2$) is adsorbed on at least one adsorbent, the said adsorbent comprising particles of at least one activated alumina, characterized in that the activated alumina has a specific surface area of between 200 $m^2/g$ and 299 $m^2/g$, the activated alumina containing:
- at least 80% aluminum oxide ($Al_2O_3$),
- silicon oxide ($SiO_2$),
- iron oxide ($Fe_2O_3$), and
- from 0.001% to 7.25% of at least one oxide of at least one alkali or alkaline-earth metal.

Within the context of the invention, the percentages (%) are percentages by weight of the alumina which are measured after loss on ignition, that is to say after heating the alumina to a high temperature, for example 1100° C. Conventionally, the loss of weight resulting from such heating is of the order of approximately 5% and is essentially due to evaporation of water.

In fact, the particles of activated alumina having a specific surface area of between 200 $m^2/g$ and 299 $m^2/g$ and satisfying the above chemical composition exhibit, as will be explained below, carbon dioxide adsorption properties which are markedly superior to those of alumina particles having a specific surface area greater than 300 $m^2/g$, i.e. the conventional aluminas described in the prior art.

Depending on the case, the process of the invention may comprise one or more of the following characteristics:
- the activated alumina contains from 85% to 99.8% aluminum oxide ($Al_2O_3$), preferably from 90% to 99.5% aluminum oxide and preferentially at least 92% aluminum oxide;
- the activated alumina contains from 0.0001% to 3% by weight of silicon oxide ($SiO_2$), preferably less than 2.5% silicon oxide and/or more than 0.001% silicon oxide;
- the activated alumina contains less than 1% iron oxide ($Fe_2O_3$), preferably less than 0.5% iron oxide and/or more than 0.0005% iron oxide;
- the activated alumina contains less than 6% oxide of at least one alkali or alkaline-earth metal, preferably less than 5% oxide of at least one alkali or alkaline-earth metal and/or more than 0.1% oxide of at least one alkali or alkaline-earth metal, preferably less than 4% oxide of at least one alkali or alkaline-earth metal and/or more than 0.5% oxide of at least one alkali or alkaline-earth metal;
- the activated alumina contains at least one oxide of at least one metal chosen from sodium (Na), potassium (K) and mixtures thereof, preferably a sodium oxide ($Na_2O$);
- the activated alumina has a specific surface area of between 225 $m^2/g$ and 290 $m^2/g$, preferably between 250 $m^2/g$ and 285 $m^2/g$;
- the activated alumina has a macropore volume of between 0.01 and 0.50 cc/g, preferably between 0.03 and 0.30 cc/g and preferentially between 0.04 and 0.17 cc/g;
- the activated alumina has a density of between 760 $kg/m^3$ and 890 kg/m3, preferably between 769 $kg/m^3$ and 865 $kg/m^3$, and/or a crush resistance of between 6 kg and 17 kg, preferably between 6.6 kg and 15.2 kg;

the activated alumina is in the form of agglomerated particles having a size of between 1 mm and 5 mm, preferably from 1.5 mm to 3.5 mm; the particles being able to be spheres, rods, ellipses or of any other appropriate shape;

it is chosen from the group formed by the TSA and PSA processes, preferably the TSA process;

it is carried out at an adsorption pressure of 1 to 100 bar, preferably 4 to 50 bar, and/or at a desorption pressure of 0.1 to 10 bar, preferably 1 to 6 bar;

it comprises at least one step of regenerating the adsorbent, preferably by purging with an inert gas at a temperature of at least 50° C., for example by regenerating it using nitrogen coming from an air separation unit (ASU);

the gas stream to be purified is air or a synthesis gas, preferably air;

it comprises at least one step of removing, by adsorption, at least one impurity chosen from the group formed by water vapour ($H_2O$), nitrogen oxides ($N_xO_y$), chlorinated compounds ($C_nH_mCl_p$) and hydrocarbons ($C_nH_m$), preferably removal of water vapour;

the stream of gas to be purified contains from 1 vpm to 1000 vpm of $CO_2$, preferably from 100 vpm to 600 vpm of $CO_2$;

the at least one alkali or alkaline-earth metal compound is incorporated in the particles before the particles are activated by heating and possible calcining;

the incorporation of the at least one alkali or alkaline-earth metal compound is carried out by bringing alumina in powder form into contact with a solution containing at least one oxide or hydroxide of the at least one metal and by forming agglomerated alumina particles from the powder/solution mixture thus obtained. In this case, the activated alumina is doped by metal cations of the Na and/or K type which are incorporated directly during the process for manufacturing the alumina, that is to say during the step or steps of forming the particles. The doped particles exhibit quite remarkable and unexpected properties when they are used for removing the $CO_2$- and/or $H_2O$-type impurities contained in a gas, particularly atmospheric air or a synthesis gas. An alumina manufacturing process, which may be the inspiration for synthesizing such aluminas by means of a few modifications within the competence of those skilled in the art, is described in document U.S. Pat. No. 5,856,265, incorporated here as reference, since that document teaches a process for manufacturing particles of activated alumina containing alkali or alkaline-earth metal compounds, such as sodium hydroxide (NaOH) or potassium hydroxide (KOH), in which process a powder of activated alumina is firstly formed into agglomerates of activated alumina and then these agglomerates are treated with an aqueous solution having a pH of between 12.7 and 14, at a temperature ranging from room temperature to 95° C. (200° F.), the solution containing the abovementioned metal compound(s), and the agglomerates treated with the aqueous solution are then heated, preferably heated so as to cause rapid dehydration, at a temperature of between 400° C. and 1000° C. so as to obtain the desired particles of activated alumina including the metal cations. Such a rapid heating process is described by document U.S. Pat. No. 2,915,365, also incorporated here for reference;

the at least one alkali or alkaline-earth metal compound is incorporated, alternatively, into the particles after activation of the particles by heating and before any calcining, for example by impregnating the particles with a basic solution containing the metal cations to be incorporated into the alumina;

the solution has a pH of between 12 and 14, and preferably the pH is between 12.5 and 13.8;

the alumina is dried at a temperature of less than 200° C., preferably between 50° C. and 150° C.;

the alumina is calcined at a temperature of between 200° C. and 600° C., preferably between 300° C. and 500° C.

According to another aspect, the invention also relates to a process for producing nitrogen, argon and/or oxygen from a stream of air containing at least carbon dioxide ($CO_2$) as impurity, in which:

(a) the stream of air undergoes a purification step with removal, by adsorption, of at least some of the carbon dioxide ($CO_2$) by means of an adsorbent containing an activated alumina and by implementing a purification process according to the invention as described above, so as to obtain a stream of purified air stripped of at least some of the carbon dioxide impurities ($CO_2$), (b) the stream of purified air having undergone step (a) is subsequently cooled and undergoes at least one cryogenic separation step with the production of nitrogen, argon and/or oxygen.

According to yet another aspect, the invention also relates to a process for producing hydrogen ($H_2$) and/or carbon monoxide (CO) from a stream of a synthesis gas containing hydrogen ($H_2$) and carbon monoxide (CO) and furthermore containing at least carbon dioxide ($CO_2$) as impurity, in which:

(a) the stream of synthesis gas undergoes a purification step with removal, by adsorption, of at least some of the carbon dioxide ($CO_2$) by means of an adsorbent containing an activated alumina and by implementing a purification process according to the invention, as described above, so as to obtain a purified synthesis gas stripped of at least some of the carbon dioxide impurities ($CO_2$);

(b) the purified synthesis gas having undergone step (a) is subsequently cooled and undergoes at least one cryogenic separation step with the production of hydrogen ($H_2$) and/or carbon monoxide (CO).

BRIEF DESCRIPTION OF THE DRAWINGS

The sole figure depicts two breakthrough curves, one produced using a conventional alumina, and one using an alumina according to the invention, when removing $CO_2$ from air.

DETAILED DESCRIPTION OF THE INVENTION

The present invention will now be illustrated by means of a comparative example, given by way of illustration but implying no limitation, with reference to the appended figure.

EXAMPLE

In order to demonstrate the effectiveness of an alumina used according to the invention in the removal of the $CO_2$ contained in a stream of atmospheric air, two breakthrough curves have been produced.

The first breakthrough curve (C1) was produced using a conventional alumina commercially available at the present time, for example the alumina sold by Procatalyse under the reference 2–5 Grade A, which is in the form of balls 2 mm in diameter, the characteristics of the alumina being as follows:

| | |
|---|---|
| specific surface area (BET): | 340 m$^2$/g |
| density: | 800 kg/m$^3$ |
| crush resistance: | 16 daN |
| macroporosity (>700 Å): | 0.11 cc/g |

The second breakthrough curve (C2) was obtained using an alumina according to the invention, for example a doped activated alumina of reference A-204-4 available from Laroche Industries, which is in the form of 7×12 mesh (2.8 mm×1.4 mm) or 5×8 mesh (4 mm×2.4 mm) particles, the characteristics of the alumina being as follows:

| | |
|---|---|
| specific surface area (BET): | 270 m$^2$/g |
| density: | 817 kg/m$^3$ |
| crush resistance: | 10.8 kg |
| macroporosity (>700 Å): | 0.11 cc/g |

The chemical composition of this activated alumina A 204-4 according to the invention is as follows:

silicon oxide: approx. 0.02% by weight iron oxide: approx. 0.02% by weight aluminum oxide and metal oxides: approx. 93.9% by weight loss on ignition: approx. 6% by weight.

It should be emphasized that comparable results were obtained using the activated alumina of reference A-206 also available from Laroche Industries, which alumina is also suitable within the context of the present invention.

The characteristics of this A-206 activated alumina according to the invention are as follows:

| | |
|---|---|
| specific surface area: | 280 m$^2$/g |
| density: | 800 kg/m$^3$ |
| crush resistance: | 5.4 kg |
| macroporosity (>700 Å): | 0.10 cc/g. |

The chemical composition of this activated alumina A-206 is as follows:

silicon oxide: approx. 0.02% by weight iron oxide: approx. 0.02% by weight aluminum oxide and metal oxides: approx. 94% by weight loss on ignition: approx. 6% by weight.

In both cases, the gas to be purified contains approximately 450 ppm of carbon dioxide (before purification).

The process employed is of the TSA type and the operating conditions are as follows:

| | |
|---|---|
| adsorption pressure: | 6 bar absolute |
| gas temperature: | 25° C. |
| gas flow rate: | 1.2 Sm$^3$/h. |

The breakthrough curves C1 and C2 thus obtained are illustrated in the appended figure and clearly show that the process according to the invention (curve C2) gives results which are markedly better than for the process employed using an alumina according to the prior art (curve C1).

This is because a process employed using a conventional alumina results in a $CO_2$ breakthrough after approximately 2 to 3 hours, that is to say after 2 to 3 hours of operation, the conventional alumina bed has to undergo regeneration in order to remove the $CO_2$ adsorbed therein.

In contrast, it may be seen that, by using a doped activated alumina as recommended by the present invention (curve C2), the duration of the adsorption phase is considerably extended since, in this case, the $CO_2$ breakthrough takes place only after approximately 7 to 8 hours, that is to say the production phase is increased threefold and therefore the number of regenerations is divided by a factor of 3, or that is to say the volume of alumina to be used is less.

The process according to the invention is therefore markedly more effective than the known processes and generates considerable savings in terms of energy consumption, given that the frequency of regeneration, and therefore the number of regenerations, is divided by a factor of 3, or that the volume of alumina to be used is less, compared with a conventional process.

Moreover, when comparing the $CO_2$ adsorptivity of the alumina employed according to the invention with an alumina according to the prior art, it is found that the process according to the invention results in an adsorptivity from 3.5 to 4 times greater than that obtained using a conventional process, with equivalent kinetics.

Unexpectedly and unpredictably, the particles of activated alumina having a specific surface area of between 200 m$^2$/g and 299 m$^2$/g and having the chemical composition according to the present invention exhibit carbon dioxide adsorption properties which are markedly superior to those obtained using particles of activated alumina having a specific surface area greater than 300 m$^2$/g, that is to say the aluminas used in the conventional processes.

This furthermore means that the use of a gas purification process according to the present invention results in the use of a smaller amount of activated alumina compared with a conventional process, in order to obtain an equivalent result in terms of separation effectiveness, and therefore furthermore results in a significant reduction in the production costs.

What is claimed is:

1. Process for purifying a gas stream containing at least carbon dioxide ($CO_2$) as impurity, which comprises: adsorbing at least some of the carbon dioxide ($CO_2$) on at least one adsorbent; said adsorbent comprising particles of at least one activated alumina having a specific surface area of between 200 m$^2$/g and 299 m$^2$/g; and said activated alumina containing:

at least 80% aluminum oxide ($Al_2O_3$);

silicon oxide ($SiO_2$);

iron oxide ($Fe_2O_3$); and from 0.001% to 7.25% of at least one oxide of at least one alkali or alkaline-earth metal.

2. The process according to claim 1, wherein the activated alumina contains from 85% to 99.8% aluminum oxide ($Al_2O_3$).

3. The process according to claim 1, wherein the activated alumina contains from 0.0001% to 3% by weight of silicon oxide ($SiO_2$).

4. The process according to claim 1, wherein the activated alumina contains less than 1% iron oxide ($Fe_2O_3$).

5. The process according to claim 1, wherein the activated alumina contains less than 6% oxide of at least one alkali or alkaline-earth metal.

6. The process according to claim 1, wherein the activated alumina contains from 90% to 99.5% aluminum oxide; between 0.001% and 2.5% silicon oxide; between 0.0005% and 0.5% iron oxide; and between 0.1% and 5% oxide of at least one alkali or alkaline-earth metal.

7. The process according to claim 1, wherein the activated alumina contains at least one oxide of at least one metal selected from the group consisting of sodium (Na), potassium (K) and mixtures thereof.

8. The process according claim 1, wherein the activated alumina has a specific surface area of between 225 $m^2/g$ and 290 $m^2/g$.

9. The process according to claim 1, wherein the activated alumina has a macropore volume of between 0.01 and 0.50 cc/g.

10. The process according to claim 1, wherein the activated alumina has at least one of a density of between 760 $kg/m^3$ and 890 $kg/m^3$, and a crush resistance of between 6 kg and 17 kg.

11. The process according to claim 1, wherein the activated alumina is in the form of agglomerated particles having a size of between 1 mm and 5 mm.

12. The process according to claim 1, wherein the activated alumina is in the form of agglomerated particles having a size of between 1.5 mm to 3.5 mm; a specific surface area between 250 $m^2/g$ and 285 $m^2/g$; and a macropore volume between 0.03 and 0.30 cc/g.

13. The process according to claim 1, wherein said process is selected from the group consisting of TSA and PSA processes.

14. The process according to claim 1, wherein said process is carried out at an adsorption pressure of 1 to 100 bar, and at a desorption pressure of 0.1 to 10 bar.

15. The process according to claim 1, wherein the gas stream to be purified is air or a synthesis gas.

16. The process according to claim 1, further comprising at least one step of removing, by adsorption, at least one impurity selected from the group consisting of water vapour ($H_2O$), nitrogen oxides ($N_xO_y$), chlorinated compounds ($C_nH_mCl_p$) and hydrocarbons ($C_nH_m$).

17. The process according to claim 1, wherein the stream of gas to be purified contains from 1 vpm to 1000 vpm of $CO_2$.

18. Process for producing at least one of nitrogen, argon and oxygen from a stream of air containing at least carbon dioxide ($CO_2$) as impurity, which comprises:

(a) subjecting the stream of air to a purification step with removal, by adsorption, of at least some of the carbon dioxide ($CO_2$) by contacting said stream of air with an adsorbent containing an activated alumina and by implementing a purification process according to claim 1, so as to obtain a stream of purified air stripped of at least some of the carbon dioxide impurity ($CO_2$); and (b) subsequently cooling the stream of purified air having undergone step (a) by subjecting said stream of purified air to at least one cryogenic separation step with the production of at least one of nitrogen, argon and oxygen.

19. Process for producing at least one of hydrogen ($H_2$) and carbon monoxide (CO) from a stream of a synthesis gas containing hydrogen ($H_2$) and carbon monoxide (CO), and furthermore containing at least carbon dioxide ($CO_2$) as impurity, which comprises:

(a) subjecting the stream of synthesis gas to a purification step with removal, by adsorption, of at least some of the carbon dioxide ($CO_2$) by contacting said stream of synthesis gas with an adsorbent containing an activated alumina, and by implementing a purification process according to claim 1, so as to obtain a purified synthesis gas stripped of at least some of the carbon dioxide impurity ($CO_2$); and (b) subsequently cooling the purified synthesis gas having undergone step (a) by subjecting said purified synthesis gas to at least one cryogenic separation step with the production of at least one of hydrogen ($H_2$) and carbon monoxide (CO).

* * * * *